United States Patent Office 3,322,864
Patented May 30, 1967

3,322,864
THIONOPHOSPHORIC ACID ESTERS
Gerhard Schrader, Wuppertal-Cronenberg, Germany, assignor to Farbenfabriken Bayer Aktiengesellschaft, Leverkusen, Germany, a German corporation
No Drawing. Filed Aug. 8, 1963, Ser. No. 300,933
Claims priority, application Germany, Aug. 14, 1962, F 37,585
11 Claims. (Cl. 260—954)

The present invention relates to and has as its object new and useful, pesticidally, especially insecticidally active phosphorus containing compounds as well as a process for their production.

More specifically this invention concerns novel O,O-dialkyl- and O-alkyl-O-cycloalkylthionophosphoric acid O-phenyl esters of the general formula

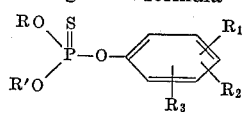

In the above formula, R denotes a straight chain alkyl and R' a branched alkyl or a cycloalkyl radical, $R_1$ and $R_2$ denote hydrogen atoms, halogen atoms, nitro, lower alkyl, alkoxy, alkylmercapto, alkylsulphoxyl, and alkylsulphonyl groups, whereas $R_3$ represents a hydrogen or halogen atom.

In accordance with the present invention it has been found that thionophosphoric acid esters of the above stated structure can be obtained by a reaction which proceeds smoothly and gives good yields when phenols of the general formula

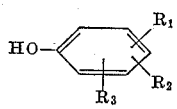

are reacted with O,O-dialkyl- or O-alkyl-O-cycloalkyl-thionophosphoric acid ester halides of the formula

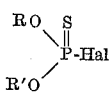

where the radicals R, R', $R_1$, $R_2$, and $R_3$ in the last mentioned formulae have the same significance as given above, whereas Hal represents a halogen atom.

The process according to the invention is preferably carried out in the presence of acid-binding agents. As such alkali metal carbonates, alkoxides, or hydroxides are particularly suitable. However, it is just as readily possible first to prepare salts, preferably the alkali metal or ammonium salts, of the above mentioned phenols and then to react these salts with the thionophosphoric acid ester chlorides of the above formula in accordance with the present invention.

In addition, it has proved to be an advantage to carry out the reaction according to the invention in an inert organic solvent and also at slightly to moderately elevated temperatures (30 to 80° C.). For this purpose, lower aliphatic alcohols, ethers, or ketones, and also in particular nitriles, for instance aceto- or propionitrile, have proved especially suitable. Finally, it is appropriate to continue heating of the reaction mixture at the stated temperatures, whilst stirring, for some time (1 to 5 hours) after combining the starting components in order to attain good yields and to produce pure products.

Some of the O,O-dialkyl- and O-alkyl-O-cycloalkyl-thionophosphoric acid ester monochlorides required as starting materials for the process according to the invention have already been described in the literature (cf. N. N. Melnikov, Ya. A. Mandelbaum, V. I. Lomakina, and Z. M. Bakanova, "Journal of General Chemistry USSR," vol. 26 (1956), No. 9, pages 2871 to 2873, as well as N. N. Melnikov, Ya. A. Mandelbaum, E. Sventsitsky, and Z. M. Bakanova, loc. cit., vol. 27 (1957), No. 7, pages 1970 to 1972).

In accordance with the method specified by the stated authors, an excess of the respective secondary or tertiary alcohol is reacted with thiophosphoryl chloride and the O-alkyl- or -cycloalkylthionophosphoric acid monoester dichloride formed as the intermediate product is converted in a secondary reaction stage by an alkali metal salt of a primary alcohol to give the desired unsymmetrical O,O-dialkyl- or O-alkyl-O-cycloalkylthionophosphoric acid ester monochloride.

According to a method not previously known which has a particularly smooth progress the O-alkyl- or O-cycloalkylphosphorous acid monoester dichlorides, readily available from the corresponding alcohols and phosphorus trichloride, are reacted with sulphur mono- or dichloride. The thionophosphoric acid dichlorides available by this method are then converted by means of alkali metal alkoxides to give the desired starting materials to be employed according to the invention.

The novel thionophosphoric acid esters obtainable according to the present invention usually constitute colourless to pale yellow coloured viscous oils insoluble in water, some of which cannot be distilled without being decomposed even under strongly reduced pressure.

The products of the inventive process are characterised by an excellent activity against a large number of harmful insects. They very effectively kill insects like aphids, spider mites, caterpillars, flies etc. They distinguish themselves especially by a good contact-insecticidal activity and mostly also by a systemic action. At the same time they have an outstanding activity on eating insects such as caterpillars. Most surprisingly they are of remarkably low toxicity against warm-blooded animals.

In comparison with the previously known O,O-dialkyl-thionophosphoric acid-O-phenyl esters of analogous constitution which contain two identical straight-chain O-alkyl ester radicals per molecule, the inventive compounds exhibit the advantage of an appreciably greater stability, particularly towards hydrolytic influences, and have a considerably improved residual activity as a consequence thereof.

Owing to their excellent insecticidal properties, the products of the invention are applied as pest control agents, particularly in plant protection and also in the field of hygiene.

They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae

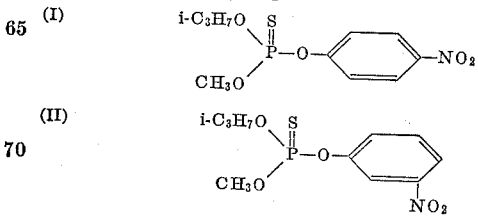

(III) 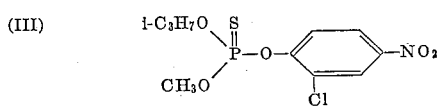

have been tested against aphids (compounds II and III), spider mites (compound I), caterpillars (compound I) and flies (compounds II and III). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against aphids (species *Doralis fabae*): Heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (In percent active ingredient/water) | Killing rate (In percent) |
|---|---|---|
| II | 0.0008 | 100 |
| III | 0.00016 | 70 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (In percent active ingredient/water) | Killing rate (In percent) |
|---|---|---|
| I | 0.0008 | 100 |

(c) Against caterpillars of the type diamondback moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (In percent active ingredient/water) | Killing rate (In percent) |
|---|---|---|
| I | 0.00016 | 100 |

(d) Against flies: About 50 flies (*Musca domestica*) are placed under covered petri dishes in which drip wet filter papers have been placed which are sprayed with insecticidal solutions of concentrations as shown below. The living status of the flies have been determined after 24 hours. The following results have been obtained:

| Compound | Aqueous concentration (In percent active ingredient/water) | Killing rate (In percent) |
|---|---|---|
| II | 0.0008 | 100 |
| III | 0.0008 | 100 |

The following examples illustrate in more detail the invention as claimed:

Example 1a

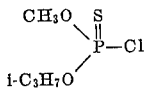

A solution of 386 g. (2 moles) of O-isopropylthionophosphoric acid dichloride in 200 cc. of benzene is treated at 0 to 5° C., whilst stirring, with a solution of sodium methoxide, which contains 2 moles of dissolved sodium. The reaction mixture is subsequently stirred at the stated temperature for another 10 minutes, and then it is poured into 1 litre of ice water. The benzene solution is washed several times with water, and it is finally dried over sodium sulphate. After evaporation of the solvent, the subsequent fractional distillation produces 304 g. (80% of the theoretical yield) of O-methyl-O-isopropylthionophosphoric acid ester monochloride of B.P. 52° C./3 mm. Hg.

Example 1b

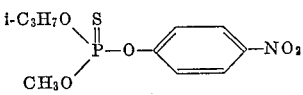

80 g. (0.5 mole) of sodium 4-nitrophenate are dissolved in 250 cc. of acetonitrile. 95 g. of O-methyl-O-isopropylthionophosphoric acid ester chloride (B.P. 52° C./3 mm. Hg) are added dropwise to this solution at 50 to 60° C., whilst stirring. The reaction mixture is subsequently warmed at 50° C. for another hour, and it is then poured into 300 cc. of ice water. The separated oil is taken up in 200 cc. of benzene, the benzene solution washed with water, and dried over sodium sulphate. Finally, the solvent is distilled off under reduced pressure at a bath temperature of 60° C., and 115 g. (79% of the theoretical yield) of O-methyl-O-isopropyl-O-(4-nitrophenyl)-thionophosphoric acid ester are obtained with a refractive index of $n_D^{24}=1.5400$.

*Analysis.*—Calculated for a molecular weight of 291: N, 4.8%; S, 11.0%; P, 10.7%. Found: N, 4.8%; S, 11.1%; P, 10.6%.

The product exhibits a mean toxicity ($LD_{50}$) of 7.5 mg. per kg. of animal perorally on the rat.

Aphids and caterpillars are still 100% destroyed by 0.00016% solutions of the compound, spider mites are completely killed by 0.0008% solutions.

Example 2

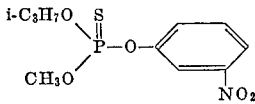

80 g. of dried, powdered potassium carbonate are first added to a solution of 70 g. (0.5 mole) of 3-nitrophenol in 250 cc. of acetonitrile and 95 g. of O-methyl-O-isopropylthionophosphoric acid ester chloride are then added dropwise to the reaction mixture at 70° C., with stirring. The mixture is subsequently stirred for two hours and then worked up as described in Example 1. The O-methyl-O-isopropyl-O-(3-nitrophenyl)-thionophosphoric acid ester is obtained in the form of a pale yellow oil which is insoluble in water. The yield amounts to 117 g. (81% of the theoretical), refractive index of the compound is $n_D^{24}=1.5420$.

*Analysis.*—Calculated for a molecular weight of 291: S, 11.0%; N, 4.8%; P, 10.7%. Found: S, 10.8%; N, 4.8%; P, 10.6%.

The mean toxicity ($LD_{50}$) of the compound amounts to 7.5 mg. per kg. of animal perorally on the rat.

Flies and aphids are 100% destroyed by 0.0008% solutions of the ester.

*Example 3*

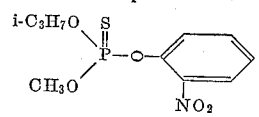

70 g. (0.5 mole) of 2-nitrophenol are dissolved in 250 cc. of acetonitrile, 80 g. of dried, finely powdered potassium carbonate are added to this solution, and 95 g. of O-methyl-O-isopropylthionophosphoric acid ester chloride are subsequently added dropwise to the reaction mixture, with stirring. The latter is thereafter heated at 70° C. for another 2 hours, and then worked up as described in Example 1. 123 g. (85% of the theoretical yield) of O-methyl-O-isopropyl-O-(2-nitrophenyl)-thionophosphoric acid ester are obtained in the form of a pale yellow oil insoluble in water, with a refractive index of $n_D^{24}=1.5331$.

*Analysis.*—Calculated for a molecular weight of 291: S, 11.0%; N, 4.8%; P, 10.7%. Found: S, 10.8%; N, 4.8%; P, 10.4%.

The means toxicity ($LD_{50}$) of the compound amounts to 37.5 mg. per kg. of animal perorally on the rat.

Caterpillars and aphids are still 100% destroyed by 0.004% solutions of the product.

*Example 4*

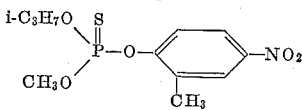

77 g. (0.5 mol) of 2-methyl-4-nitrophenol are dissolved in 250 cc. of acetonitrile. 80 g. of powdered, dried potassium carbonate are added to this solution, with stirring, and it is subsequently treated dropwise at 70° C. with 95 g. of O-methyl-O-isopropylthionophosphoric acid ester chloride, whilst stirring. The reaction mixture is subsequently heated at 70° C. for another 3 hours and then worked up as described in Example 1. The O-methyl-O-isopropyl-O-(2-methyl-4-nitrophenyl)-thionophosphoric acid ester is obtained in the form of a pale yellow oil which is insoluble in water. The yield amounts to 135 g. (89% of the theoretical).

*Analysis.*—Calculated for a molecular weight of 305: N, 4.6%; S, 10.5%; P, 10.1%. Found: N, 4.4%; S, 10.03%; P, 10.2%.

The product exhibits a mean toxicity ($LD_{50}$) of 50 mg. per kg. of animal perorally on the rat.

Aphids are 100% destroyed by 0.004% solutions and caterpillars even by 0.001% solutions of the compound.

*Example 5*

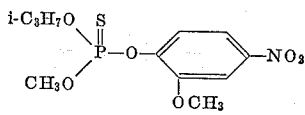

A solution of 85 g. (0.5 mole) of 2-methoxy-4-nitrophenol in 250 cc. of acetonitrile is first treated with 80 g. of dried, powdered potassium carbonate, and 95 g. of O-methyl-O-isopropylthionophosphoric acid ester chloride are subsequently added dropwise at 70° C. to the reaction mixture. The latter is thereafter heated at 70° C. for another 2 hours and then worked up as described in Example 1. 134 g. (83% of the theoretical yield) of O-methyl-O-isopropyl-O-(2-methoxy-4-nitrophenyl)-thionophosphoric acid ester are obtained as a pale yellow oil insoluble in water. The refractive index of the compound is $n_D^{23}=1.5467$.

*Analysis.*—Calculated for a molecular weight of 321: S, 10.0%; N, 4.3%; P, 9.6%. Found: S, 9.7%; N, 4.3%; P, 9.4%.

The mean toxicity ($LD_{50}$) of the compound amounts to 15 mg. per kg. of animal perorally on the rat.

Spider mites are completely destroyed by 0.004% solutions, caterpillars even by 0.0008% solutions of the ester.

By a method analogous to that described in the preceding examples, the following compounds are obtained:

| Constitution | Physical properties | Yield (percent of theoretical) | Insecticidal activity | | |
|---|---|---|---|---|---|
| | | | Administration against— | Concentration of Active ingredient in percent | Killing rate of pests in percent |
| $CH_3O\underset{i\text{-}C_3H_7O}{\diagup}\overset{S}{\underset{\|}{P}}\text{-}O\text{-}C_6H_3(CH_3)\text{-}SCH_3$ | B.P. 98° C./0.01 mm. Hg | 65 | Spider mites / Flies | 0.0008 / 0.004 | 98 / 100 |
| $CH_3O\underset{i\text{-}C_3H_7O}{\diagup}\overset{S}{\underset{\|}{P}}\text{-}O\text{-}C_6H_4\text{-}Cl$ | B.P. 82° C./0.01 mm. Hg | 77 | Flies | 0.01 | 100 |
| $CH_3O\underset{i\text{-}C_3H_7O}{\diagup}\overset{S}{\underset{\|}{P}}\text{-}O\text{-}C_6H_3(Cl)\text{-}Cl$ | B.P. 88° C./0.01 mm. Hg | 75 | Flies | 0.001 | 100 |
| $CH_3O\underset{i\text{-}C_3H_7O}{\diagup}\overset{S}{\underset{\|}{P}}\text{-}O\text{-}C_6H_4\text{-}SCH_3$ | B.P. 91° C./0.01 mm. Hg | 63 | Caterpillars / Spider mites | 0.0008 / 0.0008 | 100 / 80 |

| Constitution | Physical properties | Yield (percent of theoretical) | Insecticidal activity | | |
|---|---|---|---|---|---|
| | | | Administration against— | Concentration of Active ingredient in percent | Killing rate of pests in percent |
| (CH₃O)(i-C₃H₇O)P(=S)−O−C₆H₂(Cl)(Cl)(CH₃) | ---------- | 73 | Flies | 0.0008 | 100 |
| (CH₃O)(i-C₃H₇O)P(=S)−O−C₆H₃(OCH₃)−NO₂ | ---------- | 76 | Caterpillars / Mosquito larvae | 0.001 / 0.00001 | 100 / 95 |
| (CH₃O)(i-C₃H₇O)P(=S)−O−C₆H₃(Cl)−NO₂ | ---------- | 58 | Spider mites | 0.0008 | 100 |
| (CH₃O)(i-C₃H₇O)P(=S)−O−C₆H₃(CH₃)−NO₂ | ---------- | 67 | Caterpillars | 0.0008 | 100 |
| (CH₃O)(i-C₃H₇O)P(=S)−O−C₆H₃(Cl)−NO₂ | ---------- | 53 | Flies / Aphids | 0.0008 / 0.00016 | 100 / 70 |
| (CH₃O)(i-C₃H₇O)P(=S)−O−C₆H₄−SO₂CH₃ | ---------- | 72 | Spider mites | 0.001 | 50 |
| (CH₃O)(i-C₃H₇O)P(=S)−O−C₆H₃(CH₃)−SO₂CH₃ | ---------- | 72 | Spider mites | 0.004 | 100 |
| (CH₃O)(i-C₃H₇O)P(=S)−O−C₆H₃(CH₃)−SOCH₃ | ---------- | 69 | Spider mites | 0.004 | 100 |
| (CH₃O)(i-C₃H₇O)P(=S)−O−C₆H₄−SOCH₃ | ---------- | 70 | Caterpillars | 0.004 | 100 |

Example 6a

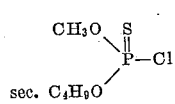

207 g. (1 mole) of O-sec.butyl-thionophosphoric acid dichloride are dissolved in 800 cc. of benzene, and a solution of sodium methoxide is added dropwise, whilst stirring, to this solution at 0 to 5° C. which contains 1 mole of dissolved sodium. The reaction mixture is subsequently stirred for 10 to 15 minutes, and then worked up as described in Example 1a. 176 g. (88% of the theoretical yield) of O-methyl-O-sec.butyl-thionophosphoric acid ester monochloride of B.P. 61° C./1 mm. Hg are obtained.

Example 6b

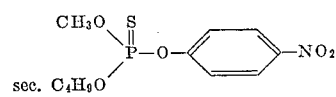

82 g. (0.4 mole) of O-methyl-O-sec.butyl-thionophosphoric acid ester monochloride are added at 50 to 60° C., with stirring, to a solution of 64 g. (0.4 mole) of sodium 4-nitrophenate in 250 cc. of acetonitrile, the reaction mixture is subsequently stirred at 60° C. for another 2 hours and then it is poured into 500 cc. of ice water. The separated oil is taken up in 300 cc. of benzene, and the benzene solution is separated from the aqueous layer, washed with water, and dried over sodium sulphate. After the solvent has been distilled off, 75 g. of O-methyl-O-sec.butyl-O-(4-nitrophenyl) - thionophosphoric acid ester (62% of the theoretical yield) are obtained in the form of an oil which rapidly solidifies as crystals. When recrystallised from methanol, the product melts at 70° C.

The following compounds can be obtained under analogous reaction conditons:

5° C., whilst stirring. The reaction mixture is subsequently stirred for another 15 minutes and then worked up as described in Example 1a. 460 g. (80% of the theoretical yield) of O-methyl-O-cyclohexyl-thionophosphoric acid ester monochloride are obtained in the form of a colourless oil insoluble in water.

| Constitution | Yield (percent of theoretical) | Insecticidal activity | | |
|---|---|---|---|---|
| | | Administration against— | Concentration of active ingredient in percent | Killing rate of pests in percent |
| CH₃O\P(=S)/sec. C₄H₉O — O — C₆H₄ — Cl | 74 | Flies | 0.01 | 100 |
| CH₃O\P(=S)/sec. C₄H₉O — O — C₆H₄ — NO₂ | 67 | Caterpillars | 0.01 | 100 |
| CH₃O\P(=S)/sec. C₄H₉O — O — C₆H₄ — NO₂ | 73 | Aphids | 0.01 | 100 |
| CH₃O\P(=S)/sec. C₄H₉O — O — C₆H₃(Cl) — Cl | 77 | Flies | 0.01 | 100 |
| CH₃O\P(=S)/sec. C₄H₉O — O — C₆H₂(Cl)(Cl) — Cl | 67 | Mosquito larvae | 0.0001 | 50 |
| CH₃O\P(=S)/sec. C₄H₉O — O — C₆H₄ — SCH₃ | 79 | Mosquito larvae | 0.00001 | 80 |
| CH₃O\P(=S)/sec. C₄H₉O — O — C₆H₃(CH₃) — SCH₃ | 73 | Mosquito larvae | 0.00001 | 90 |
| CH₃O\P(=S)/sec. C₄H₉O — O — C₆H₄ — SOCH₃ | 81 | Grain weevils | 0.01 | 100 |
| CH₃O\P(=S)/sec. C₄H₉O — O — C₆H₃(CH₃) — SOCH₃ | 75 | Caterpillars | 0.01 | 100 |
| CH₃O\P(=S)/sec. C₄H₉O — O — C₆H₄ — SO₂CH₃ | 81 | Mosquito larvae | 0.00001 | 50 |
| CH₃O\P(=S)/sec. C₄H₉O — O — C₆H₃(CH₃) — SO₂CH₃ | 78 | Aphids | 0.01 | 100 |

*Example 7a*

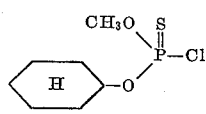

383 g. (2.5 moles) of O-cyclohexyl-thionophosphoric acid dichloride are dissolved in 2000 cc. of benzene, and a solution of sodium methoxide containing 2.5 moles of dissolved sodium is added to this solution at 0 to

*Analysis.*—Calculated for a molecular weight of 229: Cl, 15.5%; S, 140%; P, 13.5%. Found: Cl, 15.6%; S, 14.4%; P, 13.3%.

*Example 7b*

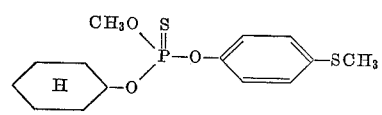

56 g. (0.4 mole) of 4-methylmercaptophenol are dissolved in 300 cc. of acetonitrile. 64 g. of dried, sifted potassium carbonate are added to this solution and subsequently 93 g. (0.4 mole) of O-methyl-O-cyclohexyl-thionophosphoric acid ester monochloride are added dropwise to the reaction mixture at 80° C., whilst stirring. The mixture is thereafter heated at 80° C., for another hour and then it is poured into 400 cc. of ice water. The separated oil is taken up in 300 cc. of benzene, the benzene solution is separated from the aqueous layer, the former is washed with water, and it is dried over sodium sulphate. After the solvent has been distilled off, the O - methyl - O-cyclohexyl-O-(4-methylmercaptophenyl)-thionophosphoric acid ester remains in the form of a pale yellow oil insoluble in water. The yield amounts to 96 g. (72% of the theoretical).

*Analysis.*—Calculated for a molecular weight of 332: S, 19.2%; P, 9.3%. Found: S, 18.9%; P, 8.7%.

Mosquito larvae are completely destroyed by 0.0001% solutions of the ester.

The following compounds are obtained by the same method:

*Example 8a*

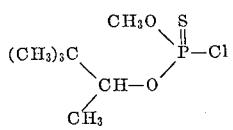

A solution of sodium methoxide containing 2.5 moles of dissolved sodium is added dropwise, with stirring, to a solution of 587 g. (2.5 moles) of O-pinacolyl-thionophosphoric acid dichloride in 2000 cc. of benzene. Stirring of the reaction mixture is subsequently continued for 15 minutes, and then it is worked up as described in Example 1a. 480 g. (83% of the theoretical yield) of O-methyl-O-pinalcoyl-thionophosphoric acid ester monochloride are obtained in the form of an oil insoluble in water.

*Analysis.*—Calculated for a molecular weight of 231: S, 13.8%; Cl, 15.4%. Found: S, 12.6%; Cl, 14.9%.

| Constitution | Yield (percent of theoretical) | Insecticidal activity | | |
|---|---|---|---|---|
| | | Administration against— | Concentration of active ingredient in percent | Killing rate of pests in percent |
| CH₃O–P(=S)(–O–C₆H₁₁)–O–C₆H₃(CH₃)–SCH₃ | 67 | Larvae of flies | 0.01 | 100 |
| CH₃O–P(=S)(–O–C₆H₁₁)–O–C₆H₂Cl₃ | 72 | Larvae of flies | 0.01 | 80 |
| CH₃O–P(=S)(–O–C₆H₁₁)–O–C₆H₄–Cl | 87 | Caterpillars | 0.1 | 100 |
| CH₃O–P(=S)(–O–C₆H₁₁)–O–C₆H₃Cl₂ | 85 | Grain weevils | 0.1 | 100 |
| CH₃O–P(–O–C₆H₁₁)–O–C₆H₄–NO₂ | 78 | Caterpillars | 0.004 | 100 |
| CH₃O–P(=S)(–O–C₆H₁₁)–O–C₆H₄–NO₂ | 61 | Mosquito larvae | 0.0001 | 50 |
| CH₃O–P(=S)(–O–C₆H₁₁)–O–C₆H₄–NO₂ | 67 | Caterpillars | 0.001 | 100 |
| CH₃O–S(=S)(–O–C₆H₁₁)–O–C₆H₃(CH₃)–SO₂CH₃ | 72 | Mosquito larvae | 0.001 | 100 |
| CH₃O–P(=S)(–O–C₆H₁₁)–O–C₆H₄–SOCH₃ | 68 | Larvae of flies | 0.01 | 100 |

*Example 8b*

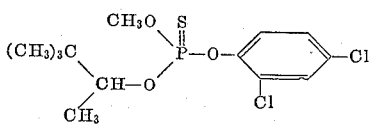

A solution of 82 g. (0.5 mole) of 2,4-dichlorophenol in 300 cc. of acetonitrile is first treated with 80 g. of dried and sifted potassium carbonate and thereafter dropwise with 115 g. (0.5 mole) of O-methyl-O-pinacolyl-thionophosphoric acid ester monochloride at 80° C., whilst stirring. The reaction mixture is thereafter heated at 80° C. for another 2 hours and then it is worked up as has already been repeatedly described. 135 g. (76% of the theoretical yield) of O-methyl-O - pinacolyl - O-(2,4-dichlorophenyl)-thionophosphoric acid ester are obtained in the form of a colourless oil insoluble in water.

*Analysis.*—Calculated for a molecular weight of 357: S, 9.0%; P, 8.7%. Found S, 8.7%; P, 7.9%.

Grain weevils are completely destroyed by 0.01% solutions of the ester.

The following compounds are obtained under analogous reaction conditions:

| Constitution | Yield (percent of theoretical) | Insecticidal activity | | |
|---|---|---|---|---|
| | | Administration against— | Concentration of active ingredient in percent | Killing rate of pests in percent |
| (CH₃)₃C-CH(CH₃)-O-P(=S)(OCH₃)-O-C₆H₄-Cl | 68 | Mosquito larvae | 0.001 | 100 |
| (CH₃)₃C-CH(CH₃)-O-P(=S)(OCH₃)-O-C₆H₃(CH₃)-SCH₃ | 66 | Spider mites | 0.01 | 100 |
| (CH₃)₃C-CH(CH₃)-O-P(=S)(OCH₃)-O-C₆H₄-SCH₃ | 65 | Mosquito larvae | 0.0001 | 100 |
| (CH₃)₃C-CH(CH₃)-O-P(=S)(OCH₃)-O-C₆H₃(CH₃)-SO₂CH₃ | 67 | Mosquito larvae | 0.001 | 100 |
| (CH₃)₃C-CH(CH₃)-O-P(=S)(OCH₃)-O-C₆H₄-NO₂ | 61 | Mosquito larvae | 0.001 | 100 |
| (CH₃)₃C-CH(CH₃)-O-P(=S)(OCH₃)-O-C₆H₄-SOCH₃ | 60 | Spider mites | 0.01 | 100 |
| (CH₃)₃C-CH(CH₃)-O-P(=S)(OCH₃)-O-C₆H₃(CH₃)-SOCH₃ | 59 | Mosquito larvae | 0.001 | 100 |
| (CH₃)₃C-CH(CH₃)-O-P(=S)(OCH₃)-O-C₆H₂Cl₃ | 79 | Mosquito larvae | 0.001 | 60 |
| (CH₃)₃C-CH(CH₃)-O-P(=S)(OCH₃)-O-C₆H₄-SO₂CH₃ | 63 | Spider mites | 0.01 | 95 |

I claim:
1. Compounds of the formula

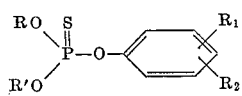

wherein
R stands for straight chain lower alkyl having up to 4 carbon atoms,
R' stands for a member selected from the group consisting of branched chain alkyl having 3 to 6 carbon atoms and cyclohexyl,
$R_1$ stands for a member selected from the group consisting of chloro and nitro,
$R_2$ stands for a member selected from the group consisting of hydrogen, chloro, methyl and methoxy.

2. A compound according to claim 1 wherein $R_1$ stands for chloro and $R_2$ stands for hydrogen or chlorine.

3. A compound according to claim 1 wherein R stands for methyl and R' stands for isopropyl, tertiary butyl, pinacolyl or cyclohexyl.

4. A compound according to claim 1 wherein R stands for methyl, R' stands for isopropyl, tertiary butyl, pinacolyl or cyclohexyl, $R_1$ stands for nitro and $R_2$ stands for hydrogen.

5. A compound according to claim 2 wherein R stands for methyl and R' stands for isopropyl, tertiary butyl, pinacolyl or cyclohexyl.

6. A compound according to claim 1 wherein $R_1$ stands for nitro.

7. The compound of the following formula

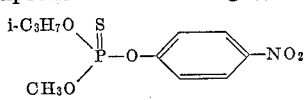

8. The compound of the following formula

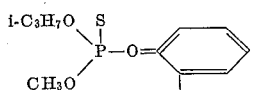

9. The compound of the following formula

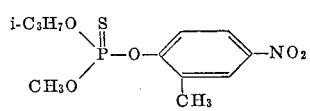

10. The compound of the following formula

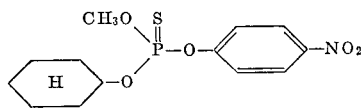

11. The compound of the following formula

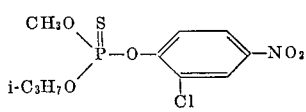

References Cited

UNITED STATES PATENTS

| | | | |
|---|---|---|---|
| 2,520,393 | 8/1950 | Fletcher | 260—954 |
| 2,758,954 | 8/1956 | Tidwell | 260—954 |
| 2,891,085 | 6/1959 | Britton et al. | 260—964 |
| 2,915,429 | 12/1959 | Scherer et al. | 167—22 |
| 2,941,923 | 6/1960 | Albert | 260—954 X |
| 2,968,591 | 1/1961 | Tracy | 167—22 |
| 3,017,422 | 1/1962 | Thompson | 260—461 |
| 3,079,417 | 2/1963 | Farrar | 260—461 |

FOREIGN PATENTS

| | | |
|---|---|---|
| 568,504 | 6/1958 | Belgium. |

CHARLES B. PARKER, *Primary Examiner.*
RICHARD L. RAYMOND, *Assistant Examiner.*